Aug. 25, 1953 C. M. HAWKINS 2,649,679
SICKLE GUARD GRAIN COLLECTING TROUGH
Filed May 19, 1949 3 Sheets-Sheet 1
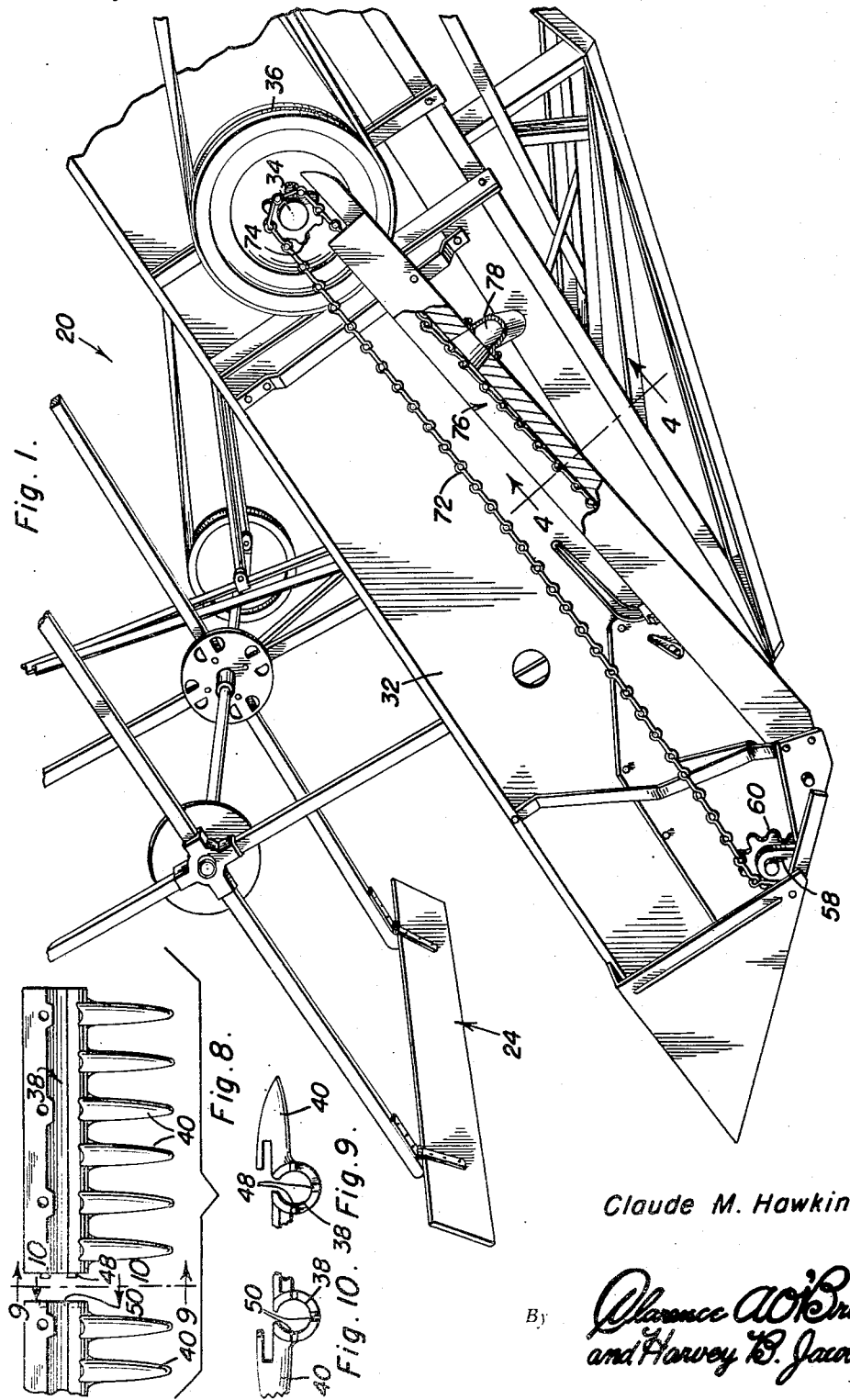
Inventor
Claude M. Hawkins

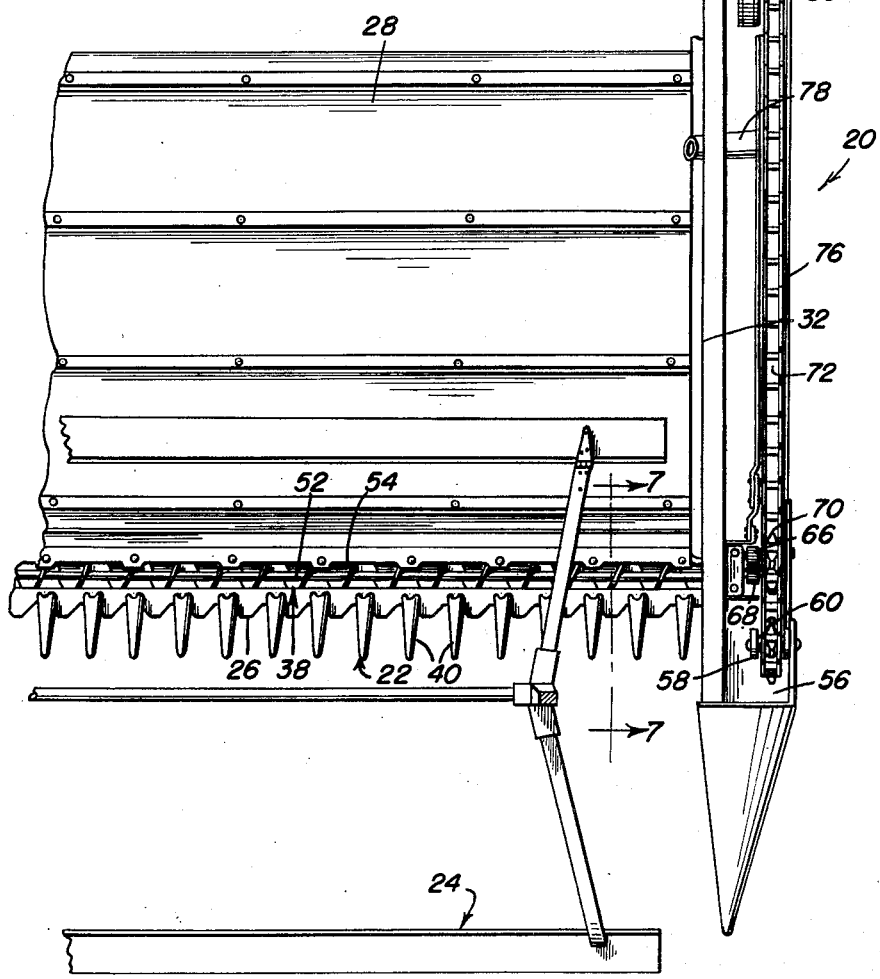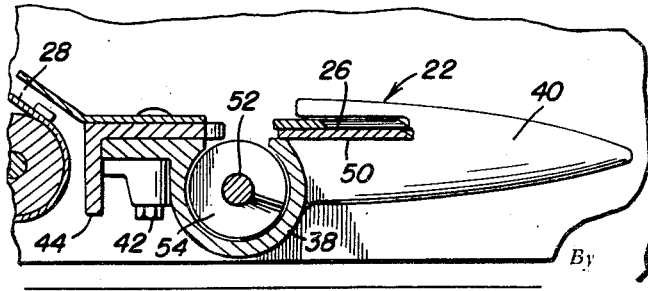

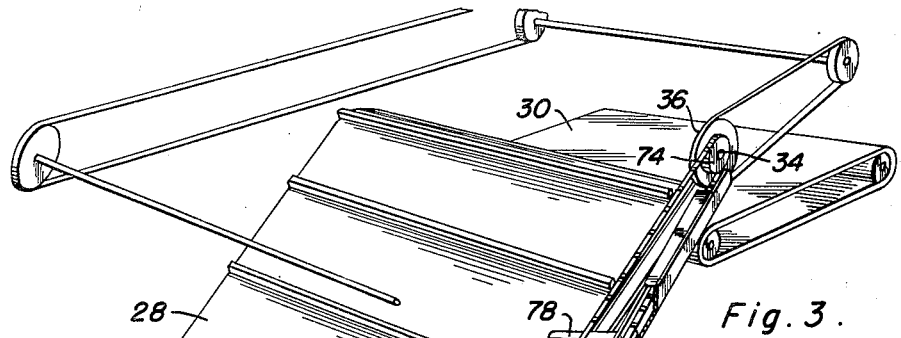
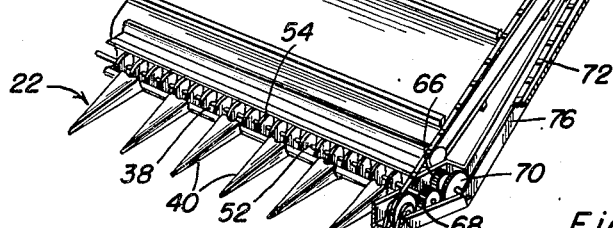
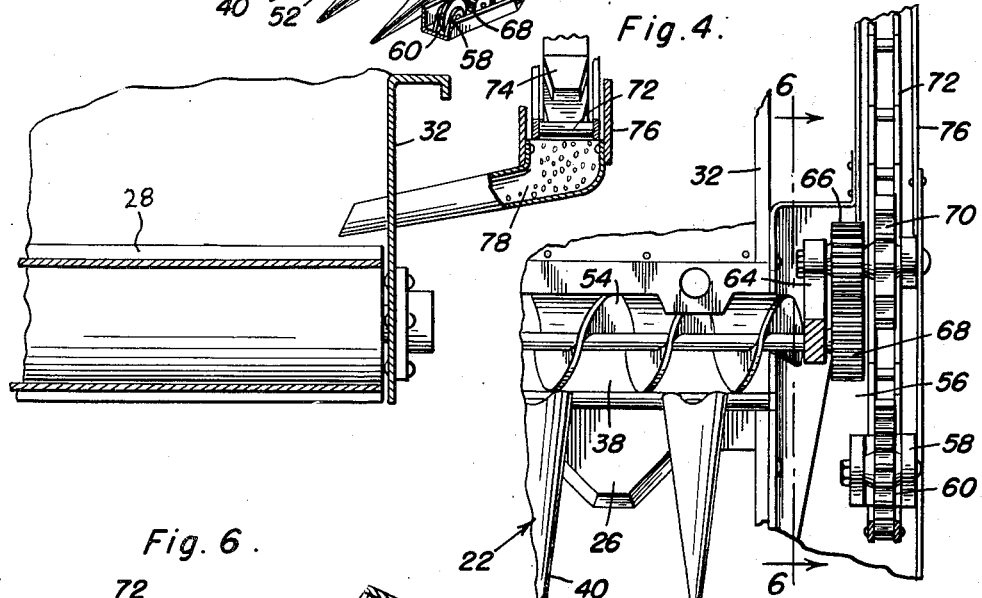
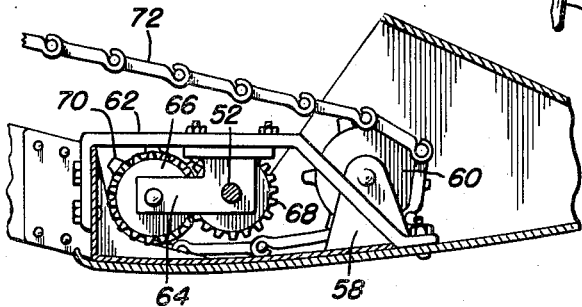
Inventor
Claude M. Hawkins

Patented Aug. 25, 1953

2,649,679

UNITED STATES PATENT OFFICE 2,649,679

SICKLE GUARD GRAIN COLLECTING TROUGH

Claude M. Hawkins, Anderson, S. C.

Application May 19, 1949, Serial No. 94,236

1 Claim. (Cl. 56—207)

This invention relates to new and useful improvements and structural refinements in grain saving devices for combines and other types of mowing machines, and the principal object of the invention is to collect loose grain which would otherwise fall to the ground at a point between the sickle mechanism and the grain conveying platform.

In particular the invention concerns itself with combines and other machines of that nature which are used for mowing small grain, liable to become scattered by vibration when the stem of the plant is cut by the sickle mechanism.

The instant invention seeks to eliminate this wastage by providing, immediately adjacent the rear edge of the usual reciprocable sickle bar, a trough to collect the scattered grain, together with means for delivering the grain collected in the trough to the conveyor platform on which the grain was originally intended to be deposited.

An important feature of the invention resides in the structural association of the grain collecting trough with the sickle mechanism, and another feature of the invention lies in the provision of an auger type conveyor in the collecting trough, whereby the grain accumulated therein may be delivered to another conveyor for subsequent delivery to the existing conveyor platform.

An additional feature of the invention resides in the construction of the above mentioned conveyor which extends between the auger conveyor and the conveyor platform, said conveyor being of a chain-type and in addition to its conveying function, also being employed for driving the auger conveyor in the grain collecting trough.

Some of the advantages of the invention reside in its simplicity of construction, in its adaptability to installation on mowing machines of different types and sizes and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figures 1 is a fragmentary side perspective view of a mowing machine wherein the invention is embodied;

Figure 2 is a fragmentary top plan view of the subject shown in Figure 1;

Figure 3 is a perspective view thereof with parts in section and partly broken away;

Figure 4 is a fragmentary cross sectional detail with parts in section and partly broken away, taken substantially on the plane of the line 4—4 in Figure 1;

Figure 5 is an enlarged top plan view showing the arrangement of the conveyors used in the invention;

Figure 6 is a cross sectional detail, taken substantially on the plane of the line 6—6 in Figure 5;

Figure 7 is a cross sectional enlarged view, taken substantially on the plane of the line 7—7 in Figure 2;

Figure 8 is a top plan view of the grain collecting trough and sickle bar fingers partly broken away;

Figure 9 is an end view, taken in the plane of the line 9—9 in Figure 8 with parts broken away, and Figure 10 is an end view, taken in the plane of the line 10—10 in Figure 8 with parts broken away.

Like characters of reference are employed to designate like parts in the specification and throughout the several views.

Referring now to the accompanying drawings in detail, the invention is embodied in a combine or a similar mowing machine which is designated generally by the reference character 20 and includes in its construction a sickle mechanism 22 disposed under a rotatable reel 24 and arranged so that the grain cut by the reciprocable sickle bar 26 falls on an upwardly and rearwardly extending conveyor platform 28 which, in turn, deposits the grain on a further conveyor platform 30.

The conveyor platform 28 is disposed between the side walls 32 only one of which is shown of a grain passageway and is driven by a shaft 34 carrying a pulley 36 which, in turn, is operatively connected to a source of motive power not shown.

The grain saving mechanism constructed in accordance with the teachings of the instant invention is embodied primarily in the sickle mechanism 22, the invention residing in the provision of a grain collecting trough 38 which is formed integrally with the usual guard fingers 40, as is best shown in Figure 7. To facilitate convenient and economical replacement in the event that any of the guard fingers 40 become broken, the trough 38 is preferably fabricated from a plurality of longitudinally aligned sections which are individually secured by means of suitable bolts 42 to a transverse supporting member 44 provided on the machine for carrying the sickle mechanism.

The sectional arrangement of the trough 38 will not only facilitate expeditious replacement of its sections when one or more of the guard fingers 40 become broken, but it will also facilitate assembly of a trough of an appropriate length to suit a particular mowing machine.

If desired, the adjacent ends of the trough sections may be provided with interfitting dogs and recesses 48, 46 respectively as is shown in Figures 8, 9 and 10, so as to maintain the sections in proper axial alignment.

The guard fingers 40 are provided with recesses to accommodate a reciprocable sickle bar 26 and the usual ledger plates 50, it being noted that the trough 38 is disposed immediately adjacent the rear edge of the sickle bar 26 and in parallelism thereto, so that when the crop is cut and deposited on the conveyor platform 28, loose grain which would normally fall to the ground drops into the trough 38 and is reclaimed in the manner hereinafter described. A shaft 52 is rotatably journaled in the trough 38 and is provided with an auger conveyor 54 whereby the grain in the trough is delivered to one end of the latter, at which point the grain falls onto a receiving plate 56 mounted exteriorly of one of the side walls 32.

The receiving plate 56 also accommodates a bearing block 58 carrying a rotatable sprocket 60, while a bracket 62, mouted upon the plate 56, carries a further bearing block 64 in which one end of the shaft 52 is journalled.

The block 64 also supports a rotatable gear 66 which meshes with a similar gear 68 on the shaft 52, and a sprocket 70 is mounted coaxially with the gear 66 and is rotatable therewith.

An endless length of chain 72 passes around the sprockets 60, 70 and also around an additional sprocket 74 mounted on the aforementioned shaft 34, whereby rotation of the conveyor 54 is simultaneous with the movement of the conveyor platform 28, as will be clearly apparent.

However, in addition to its primary purpose of transmitting drive to the conveyor 54, the chain 72 also performs an additional function, namely, that of a conveyor for delivering the grain from the plate 56 to the conveyor platform 28 on which it was originally intended to fall.

This additional function is performed by the provision of a delivery channel 76 which extends upwardly and rearwardly from the plate 56 and is provided adjacent its upper end with a gravity outlet duct 78 adapted to discharge onto the conveyor platform 28, as will be clearly apparent. The lower "run" of the chain 72 slides upwardly through the channel 76 and carries the grain from the receiving plate 56 to the delivery duct 78, through which the grain ultimately gravitates onto the platform 28, and it will be apparent from the foregoing that in this manner a substantial amount of grain which would otherwise fall to the ground is saved.

It is believed that the advantages and use of the invention will be readily apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a harvester having front and rear ends, the combination of a horizontal support member extending transversely of the front end of the harvester, a substantially cylindrical horizontal trough disposed parallel to and forwardly of said support member and having an open top to receive falling grain, said support member and said trough being substantially equal in length, said trough affording horizontal front and rear upper edges at the open top thereof, the trough comprising a plurality of coaxial sections having abutting adjacent ends, a rearwardly projecting flange provided at the rear upper edge of each trough section and underlying said support member, and a set of fastener elements securing the flange of each section to said member, whereby the sections may be selectively and individually replaced.

CLAUDE M. HAWKINS.

References Cited in the file of this patent

UNITED STATES PATENTS

| Number | Name | Date |
|---|---|---|
| 538,935 | Stucke | May 7, 1895 |
| 1,110,703 | Mikolasek | Sept. 15, 1914 |
| 1,119,677 | Bohannon | Dec. 1, 1914 |
| 1,841,718 | Edwards | Jan. 19, 1932 |
| 2,083,444 | Harden | June 8, 1937 |